(12) United States Patent
Lucas (10) Patent No.: US 6,863,256 B2
(45) Date of Patent: Mar. 8, 2005

(54) SEAL RING FOR PENDULUM VALVE ASSEMBLY

(75) Inventor: Paul D. Lucas, Melrose, MA (US)

(73) Assignee: MKS Instruments, Inc., Wilmington, MA (US)

( * ) Notice: Subject to any disclaimer, the term of this patent is extended or adjusted under 35 U.S.C. 154(b) by 114 days.

(21) Appl. No.: 10/369,952

(22) Filed: Feb. 20, 2003

(65) Prior Publication Data

US 2004/0164264 A1 Aug. 26, 2004

(51) Int. Cl.$^7$ ................................................. F16K 3/20
(52) U.S. Cl. ...................................... 251/159; 251/193
(58) Field of Search ............................ 251/159, 174, 251/177, 175, 188, 193, 300, 301; 403/348, 349, 350, 351; 411/348; 285/360, 376, 379

(56) References Cited

U.S. PATENT DOCUMENTS

| | | | |
|---|---|---|---|
| 5,577,707 A | 11/1996 | Brida | 251/159 |
| 5,873,562 A | 2/1999 | Marugg | 251/301 |
| 6,089,537 A | 7/2000 | Olmsted | 251/129.11 |
| 6,161,576 A | 12/2000 | Maher et al. | 137/565.23 |
| 6,328,051 B1 | 12/2001 | Maher | 137/1 |
| 6,409,149 B1 | 6/2002 | Maher, Jr. | 251/328 |
| 6,422,607 B1 * | 7/2002 | Kirby | 285/81 |

* cited by examiner

*Primary Examiner*—F. Daniel Lopez
*Assistant Examiner*—John K. Fristoe, Jr.
(74) *Attorney, Agent, or Firm*—McDermott Will & Emery LLP (57) ABSTRACT

A valve assembly including a housing having a flow channel, a slide plate movable between a closed position and an opened position, and a seal ring surrounding the flow channel and engaging the slide plate in the closed position and disengaging the slide plate in the opened position. The seal ring has a plurality of bores aligned, respectively, with holes formed in an adjacent surface of the housing. Each bore includes an undercut defining a lip. A plurality of fasteners are arranged in the holes of the annular surface of the housing and extend into the corresponding bores of the seal ring. Side walls of the fasteners include slots, which catch on the lips of the bores of the seal ring when the fasteners are inserted into the bores of the seal ring, and the seal ring is rotated.

20 Claims, 5 Drawing Sheets

SEAL RING FOR PENDULUM VALVE ASSEMBLY

FIELD OF THE INVENTION

The present invention relates generally to pendulum or gate valve assemblies, and more particularly to a pendulum valve assembly including a new and improved seal ring.

BACKGROUND OF THE INVENTION

A pendulum-type slide valve assembly generally includes a housing containing a pendulum valve and including an interior space and a pair of openings through which gaseous fluid can enter and exit the interior space. Pendulum valve assemblies are particularly useful in high purity gas delivery systems, such as those used in semiconductor manufacturing or other thin film coating processes. As its name implies, a pendulum valve pivots between open and closed positions, and includes a slide plate, which is usually provided as a disk or flapper, connected to a rotatably shaft by a pivot arm. In a completely opened position the slide plate is moved out of the flow path defined by the openings so that fluid can enter and exit the interior space of the housing, while in a completely closed position the slide plate is moved into sealing contact with a valve seat or annular surface surrounding one of the openings so that fluid can not enter the interior space.

The movement of the slide plate usually requires rotational (i.e., pivotal or lateral) movement between the completely opened position and an intermediate position, and then at least some longitudinal (i.e., translational, linear or axial) movement from the intermediate position to the completely closed position where the slide plate is in sealing contact with the valve seat. In order to obtain this combination of rotational and translational movement, some prior pendulum valves have typically used multiple actuator elements.

In addition, in a "standard" type gate or pendulum valve, as the gate starts to clear the opening of the valve housing, the gas flow increases rapidly. Also, since there is commonly an overlap between the gate and the opening (i.e., the gate has a larger diameter than the opening), initial movement of the gate results in little if any change in flow. Thus, the overall conductance includes very little change in flow followed by a very rapid change in flow (and vice versa as the gate is closed), which results in poor control of flow (conductance) in this operating range of the valve.

U.S. Pat. No. 6,089,537 to Olmsted, which is assigned to the assignee of the present invention and incorporated herein by reference, discloses an improved pendulum valve assembly that uses a simple rotating cam mechanism that precisely controls the rotational and longitudinal movement of the slide plate between a completely opened position and a completely closed position. The valve beneficially provides fine control near the closed position. U.S. Pat. Nos. 6,161, 576, 6,328,051 and 6,409,149, which are all assigned to the assignee of the present invention and incorporated herein by reference, also disclose improved pendulum valve assemblies and systems.

U.S. Pat. No. 5,577,707 to Brida, which is assigned to VAT Holding AG, discloses a pendulum-type slide valve including a housing having a flow channel, a slide plate for controlling flow through the channel, and a seal ring surrounding the flow channel. The seal ring engages the slide plate in the closed position and disengages the slide plate in the opened position. The seal ring is removably secured to a plurality of bolts extending through bores of the housing. The housing has an annular chamber which surrounds the flow channel and into which the bores open, and the slide valve further includes an annular piston located in the annular chamber and operatively connected with the bolts. The annular piston is subjected to a force, such as a spring, and biases the seal ring against the slide plate when the latter is displaced into its closed position.

What is further desired, however, is a new and improved pendulum valve assembly including a seal ring for engaging a slide plate of the valve assembly in a closed position and disengaging the slide plate in an opened position. Preferably, the seal ring will be easily and quickly removable for maintenance and cleaning of the valve assembly.

SUMMARY OF THE INVENTION

The present invention provides a new and improved valve assembly including a housing having a flow channel, a slide plate movable between a closed position, preventing fluid flow through the flow channel, and an opened position, allowing fluid flow through the flow channel. A seal ring surrounds the flow channel and engages the slide plate in the closed position and disengages the slide plate in the opened position. The seal ring has a plurality of circumferentially arranged bores aligned, respectively, with holes formed in an adjacent annular surface of the housing positioned coaxially about the flow channel. Each bore of the seal ring includes an undercut defining a lip.

The valve assembly also includes a plurality of fasteners arranged in the plurality of holes of the annular surface of the housing and extending into the corresponding bores of the seal ring. Side walls of the fasteners include slots, which catch on the lips of the bores of the seal ring when the fasteners are inserted into the bores of the seal ring and the seal ring is rotated with respect to the annular surface of the housing.

Among other aspects and advantages, the valve assembly of the present invention provides a quick and easy method of securing the seal ring within the valve assembly and then removing the seal ring during cleaning or maintenance of the valve assembly. It has been found that the seal ring of the present invention beneficially requires a smaller amount of rotation of the seal ring for effecting mounting and removal to the fasteners than the seal ring arrangements of existing valve assemblies, such as the valve assembly shown in U.S. Pat. No. 5,577,707 to Brida, for example.

Additional aspects and advantages of the present invention will become readily apparent to those skilled in this art from the following detailed description, wherein exemplary embodiments of the present invention are shown and described, simply by way of illustration of the best modes contemplated for carrying out the present invention. As will be realized, the present invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF EXEMPLARY EMBODIMENTS

Figure 1:
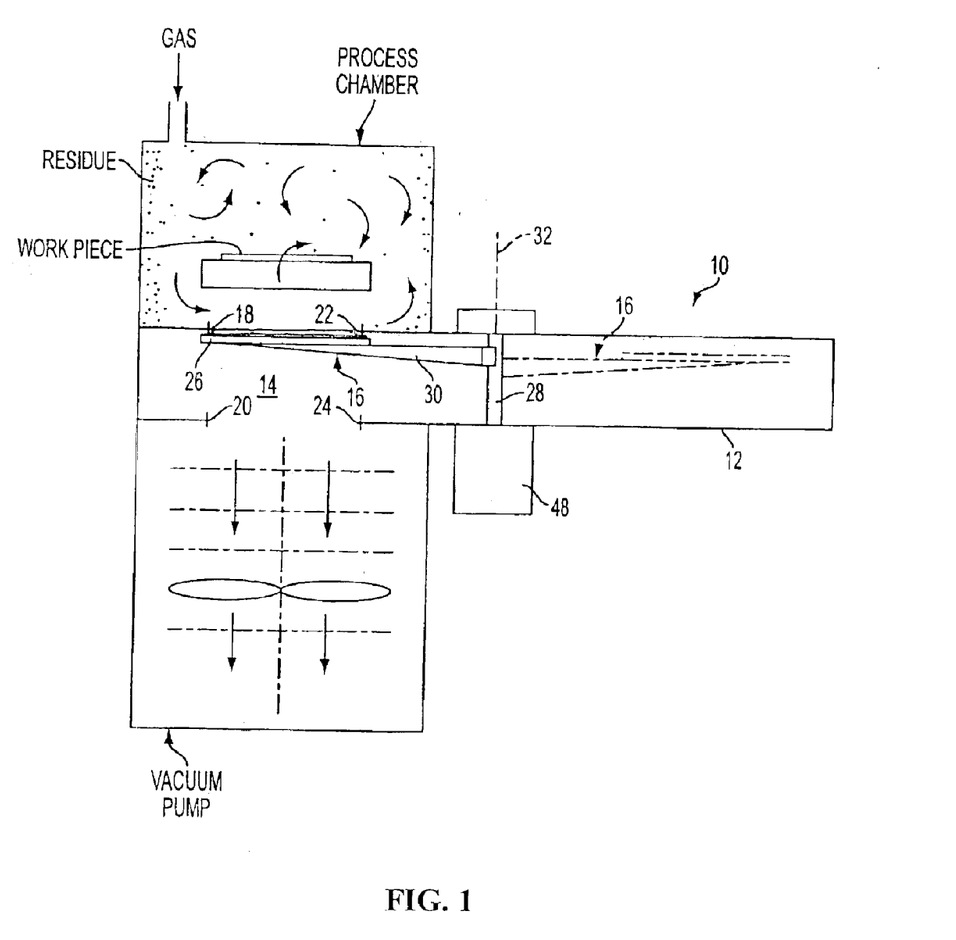
FIG. 1 is a schematic illustration of a portion of a high purity gas delivery system including an exemplary embodiment of a valve assembly constructed in accordance with the present invention separating a process chamber from a vacuum pump.

Referring to FIG. 1, an exemplary embodiment of a pendulum valve assembly 10 constructed in accordance with the present invention generally includes a housing 12 defining an flow path 14 having a pair of opposing openings 18, 20 through which gas can enter and exit the interior space. Valve seats 22, 24 are provided in the interior 14 of the housing 12 around edges of the openings 18, 20. As shown, the assembly includes a pendulum valve 16 operatively mounted within the housing and having a slide plate 26 which is pivotally movable between an opened position out of the flow path 14, as shown in broken lines in FIG. 1, and an opened position inside the flow path 14. The slide plate 26 allows reduced fluid flow through the opening 18 when in the opened position inside the flow path 14. The slide plate 26 is further laterally movable from opened position inside the flow path 14 to a completely closed position against the valve seat 22, as shown in solid lines in FIG. 1, preventing fluid flow through the opening 18.

As also shown, the first of the openings 18 of the pendulum valve assembly 10 can, for example, be connected to a process chamber and a second of the openings 20 can be connected to a vacuum pump to form a portion of a high purity gas delivery system, such as those used in semiconductor manufacturing or other thin film coating processes performed at very low pressures (high vacuums), e.g., a pressure on the order of one torr or less. In general, a work piece, such a semiconductor wafer, is placed in the chamber, while a process gas is introduce into the chamber to chemically react with the work piece in a predetermined manner. The chemical reaction may produce a residue, as shown.

The pendulum valve assembly 10 helps control the flow of gas between the process chamber and the vacuum pump by controlling the position of the slide plate 26 between the opened position out of the flow path 14, the opened position inside the flow path 14, and the completely closed position against the valve seat 22.

Figure 2:
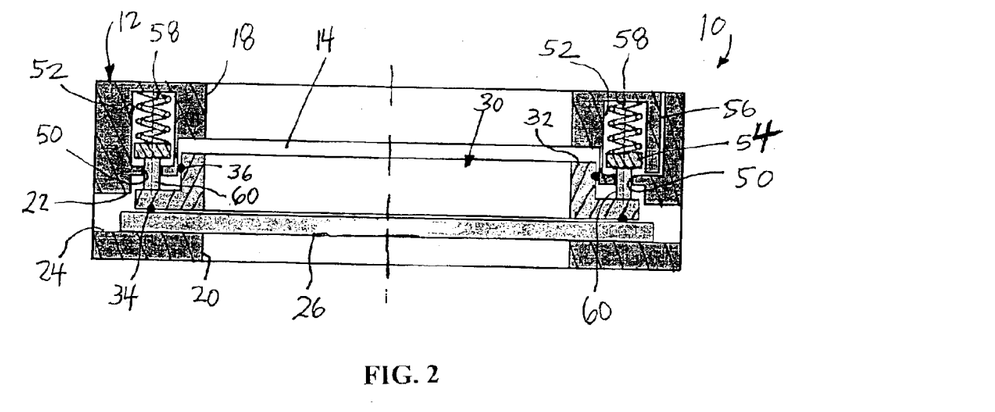
FIG. 2 is a sectional view of the valve assembly of FIG. 1, showing a slide plate of the valve assembly in a closed position with a seal ring of the valve assembly biased against the slide plate by springs applied against an annular piston operatively connected to the seal ring through fasteners.
Figure 3:
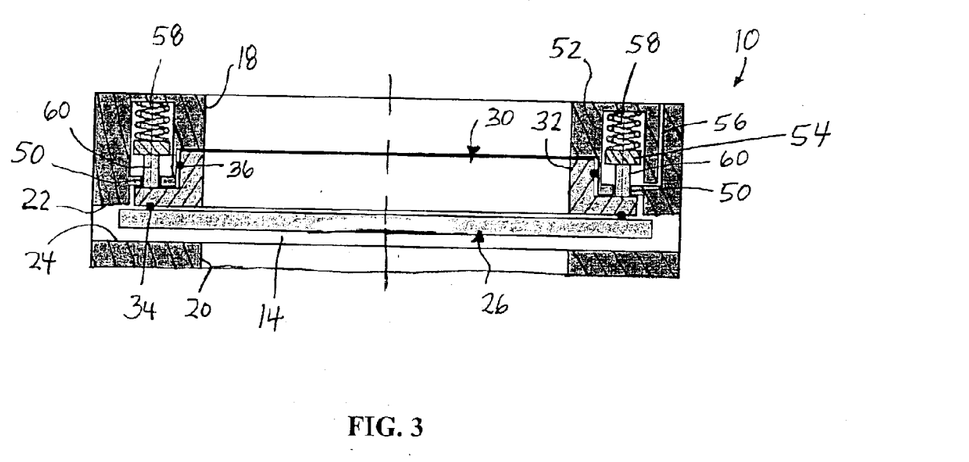
FIG. 3 is a sectional view of the pendulum valve assembly of FIG. 1, showing the slide plate in an opened position with the seal ring biased away from the slide plate by pneumatic pressure applied to the annular piston.
Figure 4:
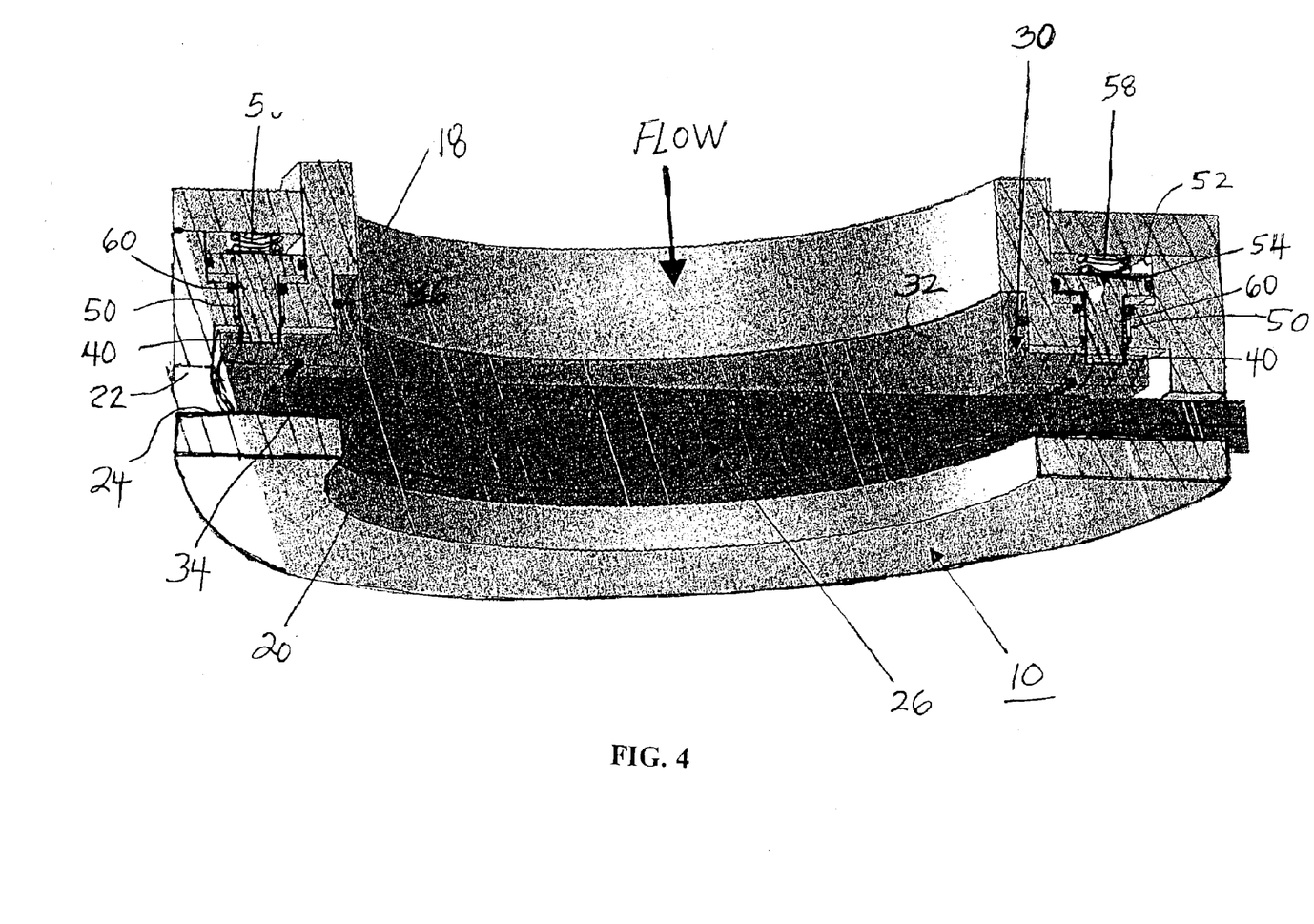
FIG. 4 is a perspective view of the pendulum valve assembly of FIG. 1, in section, showing the slide plate of the valve assembly in the opened position with the seal ring biased away from the slide plate.

Referring also to FIGS. 2 through 4, the valve assembly 10 further includes a seal ring, which coaxially surrounds the flow channel 14 and is positioned in the first opening 18 of the housing 12 and between the slide plate 26 and the valve seat 22. The seal ring 30 is provided with a nipple 32 extending towards the opening 18. The seal ring 30 supports two o-rings 34, 36 formed of an elastomeric material and located in respective grooves formed in the seal ring 30. One o-ring 34 is positioned between the seal ring 30 and the slide plate 26, while the other o-ring 36 is provided between the nipple 32 and the wall of the flow channel 14.

The seal ring 30 has on a face remote from the slide plate 26, a plurality of successive, circumferentially arranged bores 40, as shown best in FIG. 4. The bores 40 are aligned, respectively, with holes 50 formed in an adjacent annular surface of the valve seat 22 of the housing 12 positioned coaxially about the flow channel 14. Each bore 40 of the seal ring 30 includes an undercut 42 defining a lip 44. One of the bores 40 is shown in greater detail in FIGS. 5 through 7.

Figure 7:
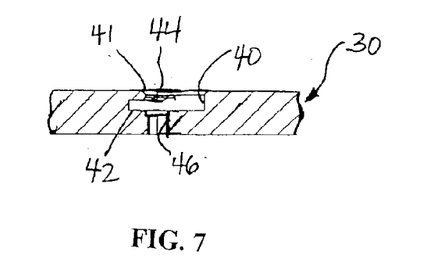
FIG. 7 is a sectional view of the portion of the seal ring taken along line 7—7 of FIG. 6.
Figure 8:
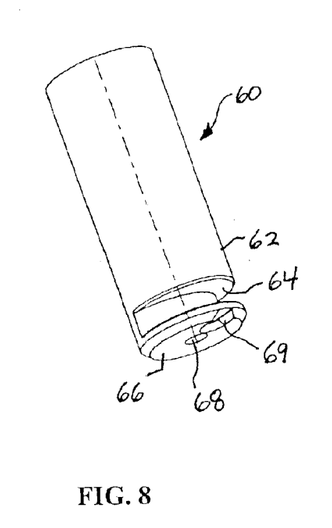
FIG. 8 is an enlarged perspective view of one of the fasteners for connecting the seal ring to the annular piston of the pendulum valve assembly of FIG. 1.
Figure 9:
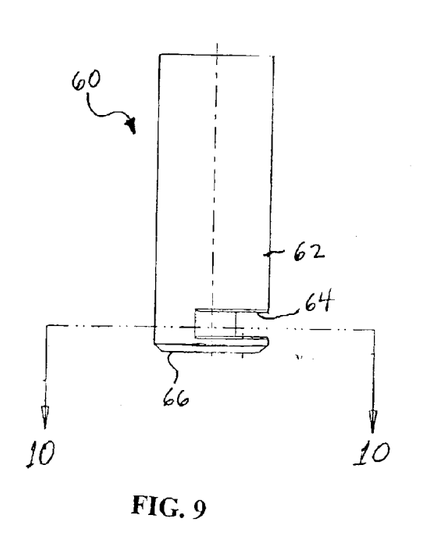
FIG. 9 is an enlarged side elevation view the fasteners of FIG. 8.
Figure 10:
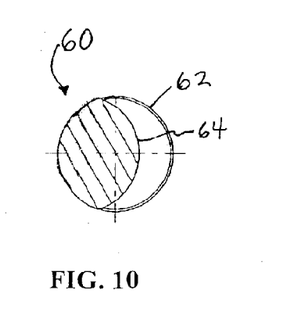
FIG. 10 is a sectional view of the fastener taken along line 10—10 of FIG. 9.

As shown in FIGS. 2 through 4, the valve assembly 10 also includes a plurality of fasteners 60 arranged in the plurality of holes 50 of the annular surface 22 of the housing 12 and have distal ends 66 extending into the corresponding bores 40 of the seal ring 30. As shown in FIGS. 7 through 9, side walls 62 of the fasteners 60 include slots 64 near the distal ends of the fasteners. The slots 64 of the fasteners 60 receive the lips 44 of the bores 40 of the seal ring 30 when the distal ends 66 of the fasteners 60 are inserted into the bores 40 of the seal ring 30, and the seal ring 30 is rotated with respect to the annular surface 22 of the housing 12, so that the seal ring 30 is removably secured to the fasteners 60.

Among other aspects and advantages, the valve assembly 10 of the present invention provides a quick and easy method of securing the seal ring 30 to the fasteners 60 within the valve assembly 10 and then removing the seal ring 30 during cleaning or maintenance of the valve assembly 10.

In the exemplary embodiments of FIGS. 5 through 10, the bores 40 of the seal ring and the side walls 62 of the fasteners 60 are circular, but could be provided in other complementary shapes. The undercut 42 of the bores 40 and the slots 64 of the fasteners 60 have rounded cross-sections, but could also be provided in other complementary shapes. As shown best in FIG. 6, the undercuts 42 of the bores 40 of the seal ring 30 have widths w that are equal to a width (i.e., diameter d) of the bores 40 (although the widths w can be provided as being less than the diameters d). The bores 40 are also provided with lead-in chamfers 41.

Figure 5:
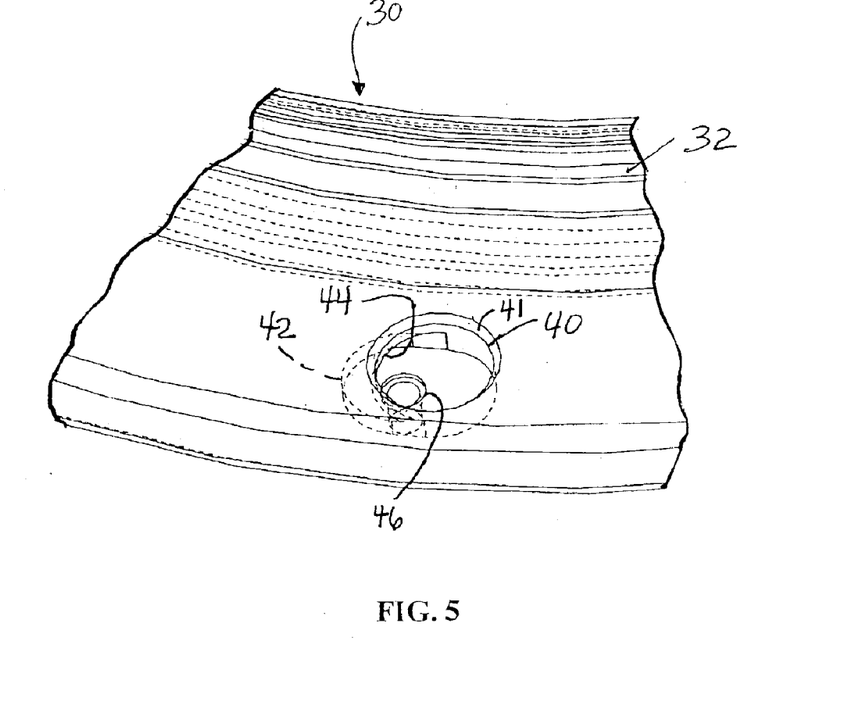
FIG. 5 is an enlarged perspective view of a portion of the seal ring of the pendulum valve assembly of FIG. 1.
Figure 6:
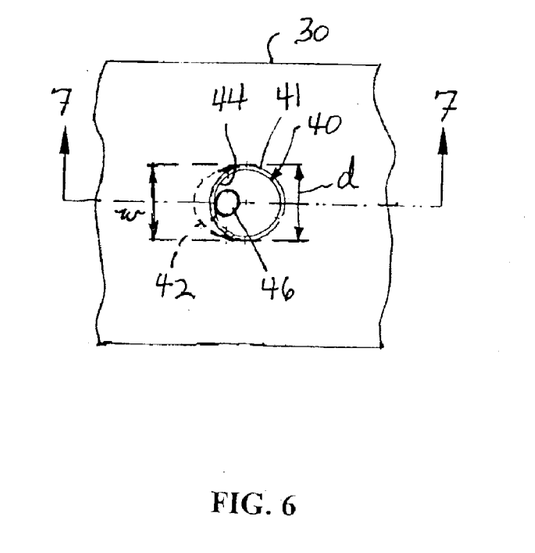
FIG. 6 is an enlarged top plan view of the portion of the seal ring of the pendulum valve assembly of FIG. 1.

Referring to FIGS. 5 through 7, each of the bores 40 of the seal ring 30 also include openings 46 for receiving ball detents (not shown) and, as shown in FIG. 8, the fasteners each include a recess 68 on the distal end 66 thereof for engaging the ball detents when the distal ends 66 of the fasteners 60 are inserted into the bores 40 of the seal ring 30, and the seal ring 30 is rotated so that the slots 64 of the fasteners 60 receive the lips 44 of the bores 40 of the seal ring 30. The ball detents help further secure the distal ends 66 of the fasteners 60 in the bores 40. As also shown in FIG. 8, the fasteners 60 preferably include ramps 69 on the distal ends 66 thereof for guiding the ball detents into the recesses 68 of the fasteners.

As shown in FIGS. 2 through 4, the holes 50 in the valve seat 22 extend to an annular chamber 52 which coaxially surrounds the flow channel 14. An annular piston 54 equipped with o-rings is located in the channel 52. The annular piston 54 is secured to the fasteners 60. In the exemplary embodiment shown, the annular piston 54 is unitarily formed as a single piece with the fasteners 60. Alternatively, however, the fasteners 60 can be removable secured to the piston 54, such as with screw threads.

An inlet conduit 56 opens into the chamber 52 and is so arranged relative to the piston 54 that the fluid, such as compressed air, flowing therethrough acts only on one side of the piston 54. There are further provided a plurality of springs 58 which act on a side of the annular piston 54 remote from the fasteners 60. The number of springs 58 is independent of the number of the fasteners 60, and the springs 58 are not necessarily aligned with the fasteners 60. In one exemplary embodiment, the valve assembly 10 includes eight (8) of the fasteners 60 and thirty-two (32) of the springs 58.

When the slide plate 26 is pivoted into of the flow channel 14, but remains in an opened position, the seal ring 30 occupies a position shown in FIGS. 3 and 4. In this position of the seal ring 30, a pressure medium flows into the annular chamber 52 so that the annular piston 54 is displaced, against the biasing force of the springs 58 together with the fasteners 60 which are operatively connected with the annular piston 54, and the seal ring 30 which is connected to the fasteners 60. When the slide plate 26 is in its closed position, the seal ring 30 occupies a position shown in FIG. 2. To seal the closed slide plate 26, the pressure fluid is evacuated from the annular chamber 52, so that the springs 58 push the annular piston 54, together with the attached fasteners 60 and the sealing ring 30 against the slide plate 30, which is forced against the valve seat 24. The opening of the slide plate 26 is effected in reverse. Pressure fluid is supplied into the annular chamber 52 so that the annular piston 54 moves together with the fasteners 60 away from the slide plate 26, moving the seal ring 30 away from the slide plate 26. Then, the slide plate 26 is pivoted out of the flow channel 14.

To remove the seal ring 30 from the fasteners 60, the seal ring is pivoted slightly, so that the lips 44 of the seal ring 30 are withdrawn from under the slots 64 of the fasteners 60. Then, the seal ring 30 can be easily removed from the valve assembly 10 and can be cleaned without any difficulties. The mounting of the seal ring 30 in the housing 12 is effected in the reverse order. It has been found that the seal ring 30 of the present invention beneficially requires a smaller amount of rotation of the seal ring 30 for effecting mounting and removal to the fasteners 60 than the seal ring arrangements of existing valve assemblies, such as the valve assembly shown in U.S. Pat. No. 5,577,707 to Brida, for example.

It is within the scope of the invention of provide two inlet conduits opening into the annular chamber 52 so that fluid pressure would act on opposite sides of the annular piston 54, and to thereby eliminate springs. The invention is also applicable to a linear displaceable slide plate, i.e., the invention is not limited to the pendulum slide valves.

The assembly 10 can include a rotating cam mechanism that precisely controls the rotational and longitudinal movement of the slide plate 26 between a completely opened position and a completely closed position, as shown for example in U.S. Pat. No. 6,089,537, which is assigned to the assignee of the present invention and has been incorporated herein by reference. The rotating cam mechanism beneficially provides fine conductance control near the closed position of the slide plate 26. The assembly 10 can also be provided with a second valve body movable within the housing 12 between a completely opened position allowing fluid to pass through the second opening 20 and a completely closed position wherein fluid cannot pass through the second opening 20. An example of such an arrangement is show in U.S. Pat. No. 6,328,051, which is assigned to the assignee of the present invention and has been incorporated herein by reference. The assembly 10 can additionally be provided with an annular cover movable between a covered position wherein the cover protects the valve seat 24 of the second opening 20 and an uncovered position wherein the cover is spaced from the second opening so the second valve body can engage the valve seat 24 of the second opening 20. An example of such an arrangement is show in U.S. Pat. No. 6,409,149, which is assigned to the assignee of the present invention and has been incorporated herein by reference.

Thus, a new and improved pendulum valve assembly 10 constructed in accordance with the present invention has been described. In particular, the present invention produces a new and improved, yet simple and effective arrangement for providing a quick and easy method of securing the seal ring 30 within the valve assembly 10 and then removing the seal ring 30 during cleaning or repair of the valve assembly 10. The exemplary embodiments described in this specification have been presented by way of illustration rather than limitation, and various modifications, combinations and substitutions may be effected by those skilled in the art without departure either in spirit or scope from this invention in its broader aspects and as set forth in the appended claims. The valve assembly 10 of the present invention as disclosed herein, and all elements thereof, are contained within the scope of at least one of the following claims. No elements of the presently disclosed valve assembly are meant to be disclaimed.

What is claimed is:

1. A valve assembly comprising:

a housing having a flow channel and an annular surface surrounding the flow channel, the annular surface having a plurality of holes having axes extending parallel to an axis of the flow channel;

a slide plate located in the housing and movable transversely to the axis of the flow channel between a closed position, in which the slide plate blocks flow through the flow channel, and an opened position, in which the slide plate allows flow through the flow channel;

a seal ring positioned between the annular surface of the housing and the slide plate and coaxially surrounding the flow channel, the seal ring engaging the slide plate in the closed position thereof and disengaging the slide plate in the opened position thereof, wherein the seal ring has, on a side facing the annular surface of the housing, a plurality of circumferentially arranged bores aligned, respectively, with the holes formed in the adjacent annular surface of the housing, and wherein the bores each include an opening having a shape that is a complete circle include a side wall having an undercut forming a lip extending traverse to the side wall; and a plurality of fasteners displaceably arranged in the plurality of holes of the annular surface of the housing and extending into the plurality of bores, respectively, of the slide plate, wherein each of the fastener has side walls include slots, which receive the lips of the bores of the seal ring and secure the seal ring to the fasteners when the fasteners are inserted into the bores of the seal ring and the seal ring is rotated about the axis of the flow channel with respect to the annular surface of the housing, wherein the cross-sectional shape of the fasteners is circular and substantially corresponds to the circular openings of the bores.

2. A valve assembly according to claim 1, wherein the housing further includes an annular chamber which coaxially surrounds the flow passage and into which the holes formed in the annular surface open, and wherein the valve assembly further comprises an annular piston located in the annular chamber and connected to the fasteners.

3. A valve assembly according to claim 2, wherein the housing further includes at least one conduit in fluid communication with the annular chamber and wherein the annular piston is spaced from the conduit.

4. A valve assembly according to claim 3, further comprising a plurality of springs biasing the piston towards the seal ring.

5. A valve assembly according to claim 2, further comprising a plurality of springs biasing the piston towards the seal ring.

6. A valve assembly according to claim 1, wherein the seal ring has a nipple extending coaxially into the flow channel, a first annular groove provided in an end surface of the seal ring located adjacent to the slide plate, and a second annular groove provided in an outer surface of the nipple, and wherein the valve assembly further comprises two o-rings located, respectively, in the first and second grooves of the seal ring.

7. A valve assembly according to claim 1, wherein the slide plate is pivotally movable into the flow channel.

8. A valve assembly according to claim 7, wherein the slide plate is pivotally movable between a position out of the flow channel, and the opened position where the slide plate is pivoted into the slide channel but disengaged from the seal ring, and then laterally movable with respect to the axis of the flow channel between the opened position and the closed position engaged with the seal ring.

9. A valve assembly according to claim 8, further comprising a shaft fixedly coupled to the slide plate through a pivot arm extending generally laterally from the shaft, the shaft at least partially mounted within the housing to rotate about a longitudinal axis of the shaft and move substantially parallel to the axis of the flow channel to allow the slide plate to rotate into the flow channel to the opened position and move longitudinally between the opened position and the closed position.

10. A valve assembly according to claim 9, further including a cam mechanism coupled between the shaft and the housing and arranged so as to control the longitudinal movement of the shaft.

11. A valve assembly according to claim 10, wherein the cam mechanism comprises:

a cam surface defined by the housing; and a cam follower fixed to the shaft and engaging the cam surface of the housing so as to control the movement of the shaft relative to the housing.

12. A valve assembly according to claim 11, further including an actuator connected to the shaft.

13. A valve assembly according to claim 12, wherein the actuator comprises a reversible stepping motor coupled to the shaft by a gear mechanism.

14. A valve assembly according to claim 1, wherein the undercut of the bores and the slot of the fasteners have rounded cross-sections.

15. A valve assembly according to claim 1, wherein the undercut of the bores of the seal ring have a width substantially equal to a width of the bores.

16. A valve assembly according to claim 1, wherein the fasteners are unitarily formed with the annular piston.

17. A high purity gas delivery system including a valve assembly according to claim 1, and further including a process chamber connected to a vacuum pump through the valve assembly.

18. A valve assembly comprising:

a housing having a flow channel and an annular surface surrounding the flow channel, the annular surface having a plurality of holes having axes extending parallel to an axis of the flow channel:

a slide plate located in the housing and movable transversely to the axis of the flow channel between a closed position, in which the slide plate blocks flow through the flow channel, and an opened position, in which the slide plate allows flow through the flow channel;

a seal ring positioned between the annular surface of the housing and the slide plate and coaxially surrounding the flow channel, the seal ring engaging the slide plate in the closed position thereof and disengaging the slide plate in the opened position thereof, wherein the seal ring has on a side facing the annular surface of the housing, a plurality of circumferentially arranged bores aligned, respectively, with the holes formed in the adjacent annular surface of the housing, and wherein the bores each include a side wall having an undercut forming a lip extending traverse to the side wall: and a plurality of fasteners displaceably arranged in the plurality of holes of the annular surface of the housing and extending into the plurality bores, respectively, of the slide plate, wherein each of the fastener has side walls include slots, which receive the lips of the bores of the seal ring and secure the seal ring to the fasteners when the fasteners are inserted into the bores of the seal ring and the seal ring is rotated about the axis of the flow channel with respect to the annular surface of the housing, wherein the bores of the seal ring include openings for receiving ball detents, and the fasteners include recesses on ends thereof for engaging the ball detents.

19. A valve assembly according to claim 18, wherein the fasteners further include ramps on ends thereof for guiding the ball detents into the recesses of the fasteners.

20. A valve assembly according to claim 18, wherein the bores of the seal ring have circular openings.

* * * * *

UNITED STATES PATENT AND TRADEMARK OFFICE
CERTIFICATE OF CORRECTION

PATENT NO. : 6,863,256 B2
DATED : March 8, 2005
INVENTOR(S) : Paul D. Lucas

It is certified that error appears in the above-identified patent and that said Letters Patent is hereby corrected as shown below:

Column 8,
Line 39, after "the plurality", insert -- of --.

Signed and Sealed this

Thirty-first Day of May, 2005

JON W. DUDAS
*Director of the United States Patent and Trademark Office*